(12) United States Patent
Perrot et al.

(10) Patent No.: US 7,433,341 B2
(45) Date of Patent: Oct. 7, 2008

(54) METHOD FOR CONNECTING AN IEEE1394 REMOTE DEVICE TO A CLUSTER OF IEEE1394 DEVICES THROUGH A WIRELESS LINK

(75) Inventors: Sébastien Perrot, Rennes (FR); Guillaume Bichot, Princeton, NJ (US); Nicolas Burdin, Rennes (FR); Helmut Burklin, Rennes (FR); Klaus Gaedke, Hannover (DE); Gilles Straub, Acigné (FR); Christophe Vincent, Gahard (FR)

(73) Assignee: Thomson Licensing, Boulogne Billancourt (FR)

( * ) Notice: Subject to any disclaimer, the term of this patent is extended or adjusted under 35 U.S.C. 154(b) by 861 days.

(21) Appl. No.: 10/399,267

(22) PCT Filed: Oct. 18, 2001

(86) PCT No.: PCT/EP01/12332

§ 371 (c)(1),
(2), (4) Date: Apr. 16, 2003

(87) PCT Pub. No.: WO02/33902

PCT Pub. Date: Apr. 25, 2002

(65) Prior Publication Data

US 2004/0023616 A1 Feb. 5, 2004

(30) Foreign Application Priority Data

Oct. 19, 2000 (EP) .................................. 00402901

(51) Int. Cl.
*H04Q 7/24* (2006.01)

(52) U.S. Cl. ..................................................... 370/338
(58) Field of Classification Search ................. 370/338, 370/509, 328, 400, 252, 254, 466, 401, 402
See application file for complete search history.

(56) References Cited

U.S. PATENT DOCUMENTS 5,787,259 A * 7/1998 Haroun et al. .............. 709/253

(Continued)

FOREIGN PATENT DOCUMENTS

WO 01/56226 8/2001

OTHER PUBLICATIONS

"Broadband Radio Access Networks (BRAN); Hiperlan Type 2; Packet Based Convergence Layer; Part 3: IEEE 1394 Service Specific Convergence Sublayer (SSCS)", ETSI TS 101 493-3 V1.1.1, Sep. 2000, pp. 1-74.

*Primary Examiner*—Anh-Vu H Ly
(74) *Attorney, Agent, or Firm*—Joseph J. Laks; Paul P. Kiel

(57) ABSTRACT

Method for connecting an IEEE1394 remote device to a cluster of IEEE1394 devices through a wireless link comprising a first wireless device connected to the cluster and a second wireless device connected to the remote device, wherein the remote device and the first wireless device for a first wired bus and the device cluster and the second wireless device form a second wired bus. The method comprises the steps of, representing the remote device on the cluster through the first wireless device and representing the devices of the cluster to the remote device through the second wireless device, such that the remote device and the devices of the cluster function as if these devices were part of a single IEEE1394 bus.

15 Claims, 4 Drawing Sheets

U.S. PATENT DOCUMENTS

| | | | |
|---|---|---|---|
| 6,032,261 A * | 2/2000 | Hulyalkar | 710/311 |
| 6,751,221 B1 * | 6/2004 | Saito et al. | 370/392 |
| 6,822,946 B1 * | 11/2004 | Wallace | 370/328 |
| 6,914,895 B1 * | 7/2005 | Straub et al. | 370/350 |
| 6,954,467 B1 * | 10/2005 | Hillier et al. | 370/466 |
| 6,996,112 B2 * | 2/2006 | Fukunaga et al. | 370/401 |
| 7,002,928 B1 * | 2/2006 | Smyers | 370/257 |
| 7,099,322 B1 * | 8/2006 | Frouin et al. | 370/390 |
| 7,158,483 B1 * | 1/2007 | Takabatake et al. | 370/254 |
| 7,321,592 B2 * | 1/2008 | Scheel et al. | 370/402 |
| 2001/0009547 A1 * | 7/2001 | Jinzaki et al. | 370/390 |
| 2001/0023452 A1 * | 9/2001 | Spalink et al. | 709/232 |
| 2001/0024445 A1 * | 9/2001 | Noda et al. | 370/402 |
| 2001/0026557 A1 * | 10/2001 | Gaedeken et al. | 370/442 |
| 2002/0044764 A1 * | 4/2002 | Akamatsu et al. | 386/92 |
| 2003/0134590 A1 * | 7/2003 | Suda et al. | 455/3.06 |
| 2004/0037233 A1 * | 2/2004 | Suzuki et al. | 370/252 |
| 2004/0044801 A1 * | 3/2004 | Haupt et al. | 710/1 |
| 2004/0057411 A1 * | 3/2004 | Straub et al. | 370/338 |

* cited by examiner

METHOD FOR CONNECTING AN IEEE1394 REMOTE DEVICE TO A CLUSTER OF IEEE1394 DEVICES THROUGH A WIRELESS LINK

BACKGROUND OF THE INVENTION

This application claims the benefit, under 35 U.S.C. § 365 of International Application PCT/EPO1/12332, filed Oct. 18, 2001, which was published in accordance with PCT Article 21(2) on Apr. 25, 2002 in English and which claims the benefit of European patent application No. 00402901.3 filed Oct. 19, 2000.

The document 'Broadband Radio Access Networks (BRAN); HIPERLAN Type 2; Packet based convergence layer; Part 3: IEEE 1394 Service Specific Convergence Sublayer (SSCS)" defines a sublayer emulating the IEEE 1394 link layer over a ETSI BRAN Hiperlan 2 wireless network. As such, it may be present in bridge devices between wired 1394 busses, or in standalone wireless devices. When two busses are connected through a bridge, these two busses are still considered distinctly from the point of view of the IEEE 1394 standard. Moreover, since the sublayer has to be present in a standalone device, standard 1394 devices first have to be modified in order to be linked to a network through a wireless link.

Thus, the addition of a wireless link to a IEEE 1394 network results in the creation of a network of several busses that can be distinguished from each other by different bus identifiers ('bus_ids'). The interconnection of the different busses (with different bus_ids) involves an IEEE 1394 bridge, which is currently under definition by the IEEE P1394.1 working group. Because of the use of different bus_ids, an application operating on bridges has to be bridge aware.

BRIEF SUMMARY OF THE INVENTION

The inventors have recognized that it is not currently possible to easily add a standard IEEE 1394 device to the network using a wireless link in such a way that, seen from the point of view of the devices on the network, only one bus exists, and thus that non bridge aware 1394 device may use the wireless link.

Accordingly, an object of the invention is a method for connecting an IEEE1394 remote device to a cluster of IEEE1394 devices through a wireless link comprising a first wireless device connected to the cluster and a second wireless device connected to the remote device, wherein the remote device and the first wireless device for a first wired bus and the device cluster and the second wireless device form a second wired bus, characterized in that it comprises the steps of:

representing the remote device on the cluster through the first wireless device and representing the devices of the cluster to the remote device through the second wireless device, such that the remote device and the devices of the cluster function as if these devices were part of a single IEEE1394 bus.

BRIEF DESCRIPTION OF THE SEVERAL VIEWS OF THE DRAWINGS

Other characteristics and advantages will appear through the description of an embodiment of the invention, described in reference to the enclosed drawings, among which.

DETAILED DESCRIPTION OF THE INVENTION

The present example is based on the IEEE 1394-1995 standard for a serial cable bus, and on the ETSI BRAN Hiperlan 2 project for wireless communication. For the latter, reference is made to the document cited in the introduction: 'Broadband Radio Access Networks (BRAN); HIPERLAN Type 2; Packet based convergence layer; Part 3: IEEE 1394 Service Specific Convergence Sublayer (SSCS)" v 1.1.1. of September 2000. This document addresses the transport of IEEE 1394 traffic between Hiperlan 2 devices.

Figure 1:
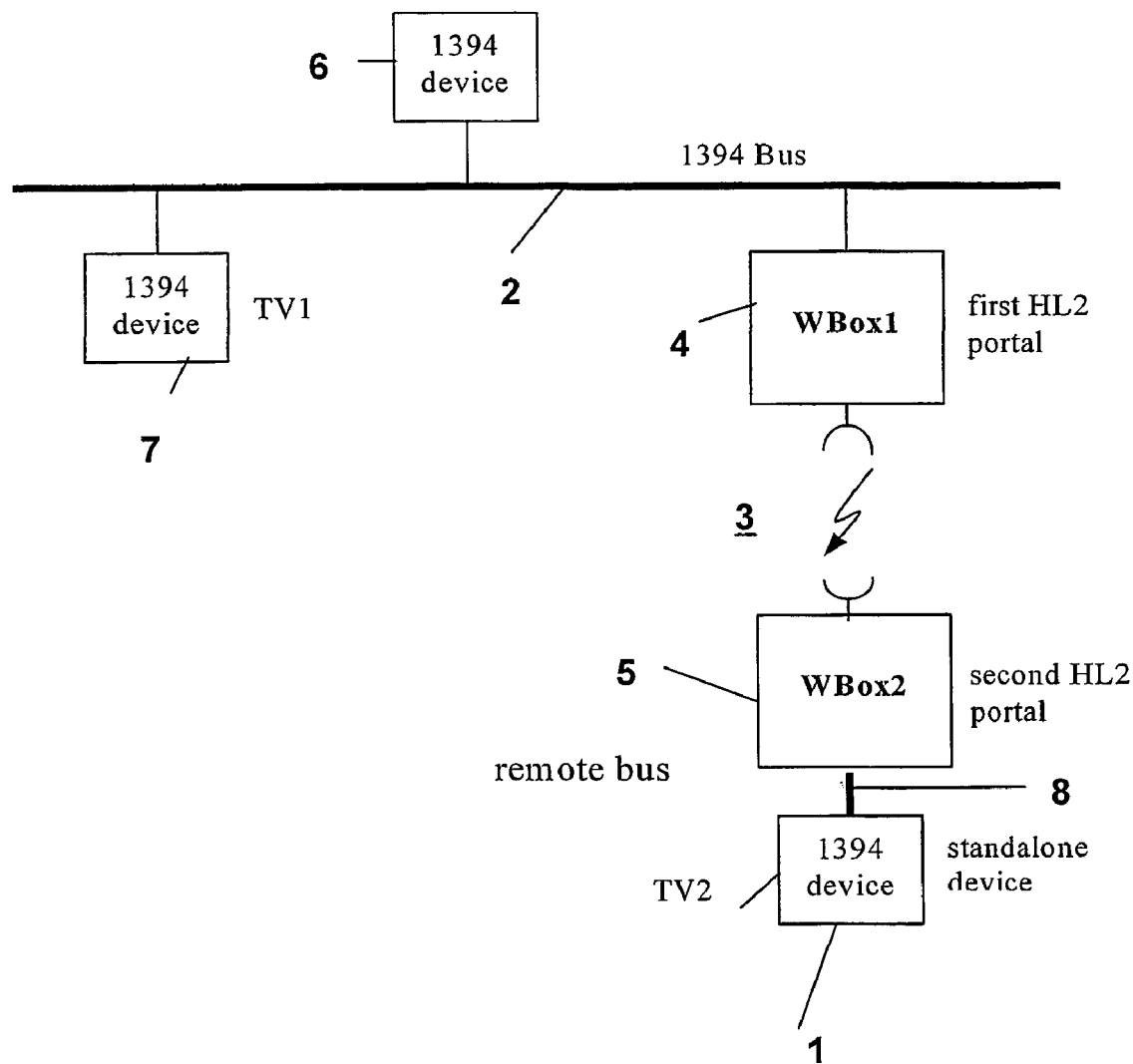
FIG. 1 schematically represents a wired bus to which a device is linked through a wireless link.

FIG. 1 represents an example of a network in which an IEEE1394 device 1 is connected to an IEEE1394 wired bus 2 through a wireless connection 3. The wireless connection is formed by two devices 4 and 5, respectively labelled "WBox1" for the device connected to the wired bus 2 and "WBox2" for the device connected to the 1394 device 1. Typically, standalone device 1 may be a consumer electronics device such as a television receiver or satellite or cable decoder. Two further devices, 6 and 7, are connected to the bus in a known fashion. The devices 6, 7 and WBox1 form what will be called a 'cluster' in the rest of the description.

Figure 2:
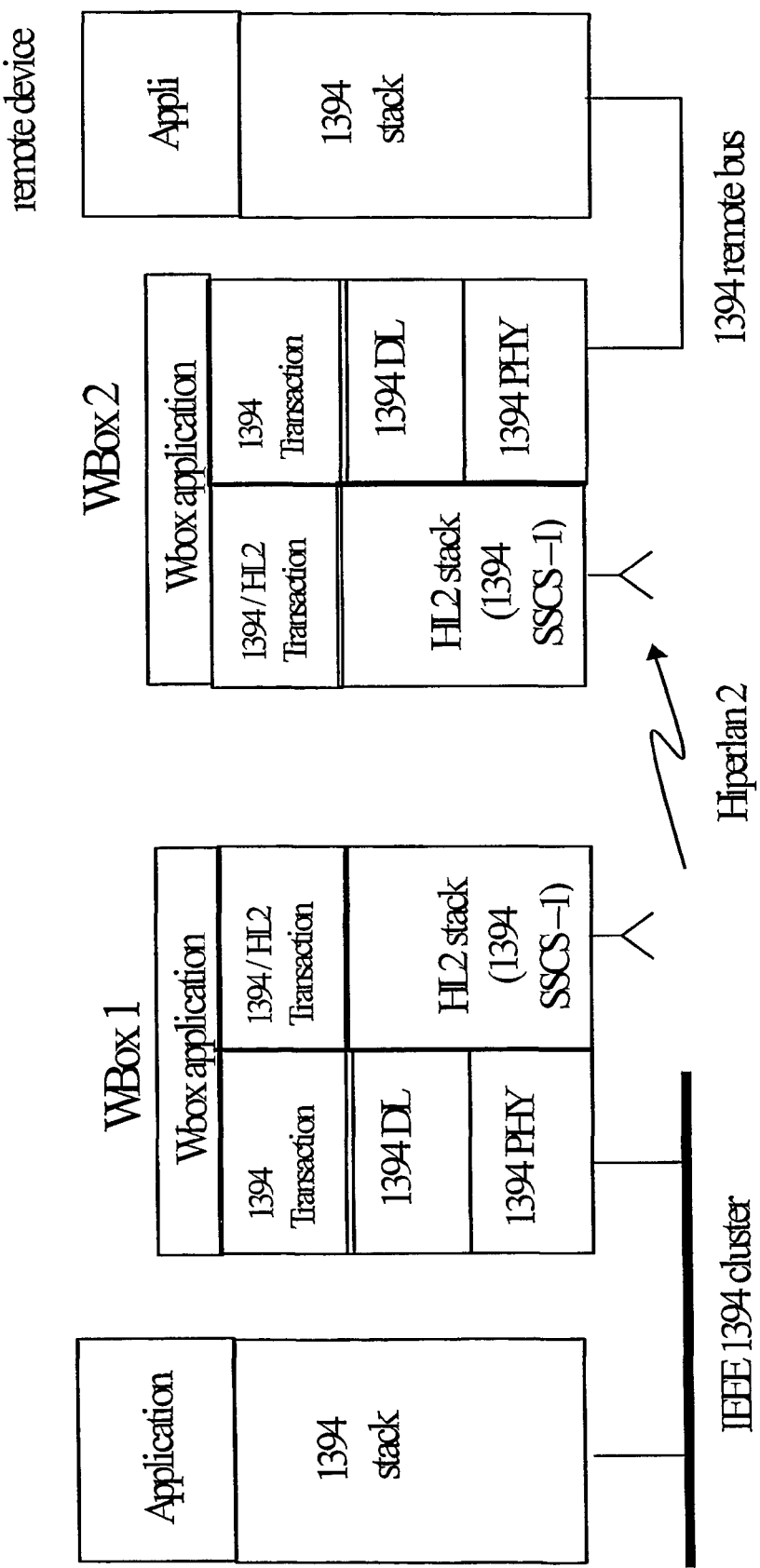
FIG. 2 is a diagram of the protocol stacks in the devices of FIG. 1.

FIG. 2 illustrates the protocol stacks in the devices "WBox1" and "WBox2". WBox1 communicates with bus 2 using the IEEE 1394 protocol stack, i.e. the physical layer, the link layer and the transaction layer. The same is true for WBox2 and the device 1. The connection between these two devices can thus also be called a wired bus (referenced 8 in FIG. 1). Some software layers of the devices WBox1 and WBox2 differ from the known IEEE 1394 stack in a manner described in more detail later. Lastly, WBox1 and WBox2 communicate using the Hiperlan 2 protocol stack as defined in the document ETSI BRAN IEEE 1394 SSCS document mentioned earlier. According to a variant embodiment, the devices WBox1 and WBox2 communicate using simplified HIPERLAN 2 protocols (neither a full Radio Link Control (RLC) layer support nor a full 1394 SSCS support is required, since WBox1 and WBox2 communicate in a point to point link and not in a network).

WBox1 and WBox2 have to behave in such a way that device 1 sees the bus 2 as if it were connected to it through a known IEEE 1394 interface, while devices on the bus 2 see device 1 in exactly the same way. Devices 1, 6 and 7 are not aware that they communicate through a wireless link.

The invention mainly impacts the physical layer, the link layer and the transaction layer of the implicated devices.

I] Physical Layer

According to the IEEE 1394 standard, each device receives a node identifier (comprising a bus identifier on 10 bits and a physical address on 6 bits) during the initialization process of the IEEE 1394 bus. During this process, a root node is elected among the connected devices. The root node launches a self-identification process, in which each device, in turn when authorized to do so by its parent device starting with the root node, sends what is called a self identification packet on the bus. The physical identifier of a node is simply the number of self identification packets a node receives before it is given the opportunity to send its own self identification packet. The root node always receives the highest physical address, i.e. the address which is attributed last.

In the present embodiment, the node identifiers on both busses 2 and 8 have to be managed in such a way that the devices see themselves as connected to a single bus. Moreover, bus resets have to be managed across the wireless link.

(a) Node Identification Procedure

From the point of view of the device WBox1 connected to the cluster, the physical layer on the cluster side is not different from that defined by the 1394 standard. During the initialization process, the device WBox1 participates in the self identification process and obtains a node identifier. This node identifier will consequently be used to designate the remote device 1, as far as devices on the cluster are concerned. WBox1 sends the list of node identifiers received from the other nodes as well as its own node identifier to WBox2.

WBox2 will try to become the root on the remote bus 8, in order to be able to generate the synchronized clock on that bus and to control the self-identification process. This is achieved by using the 'Force Root Flag' described at section 4.1.1.1 'set Force Root' of the IEEE 1394 standard.

The device WBox2 has received the list of node identifiers from the device WBox1, as well as the node identifier of WBox1 before initiating the bus reset. Instead of launching a self identification process on the remote bus, WBox2—as the root node—sends as many self identification packets to the remote device 1 as it has received node identifiers from WBox1. The node identifier of WBox1 is not counted, since it is used to represent the remote device itself. For the bus reset, the WBox2 device does not require to obtain information such as the speed capability or number of ports of the devices of the cluster. Only their self identifiers are needed.

On the remote bus, identifier '0' is attributed to the remote device 1, and subsequent node identifiers (i.e. '1' to 'x' where x is the number of devices on the cluster) are attributed to WBox2. All asynchronous traffic on the remote bus addressed to one of the nodes '1' to 'x' has to be acknowledged by the IEEE1394 link layer of WBox2. As the link layer is hardware coded this might be easier to implement than a complex routing function. The node identifier translation required by this scheme is described in more detail later on.

(b) Bus Resets

Bus resets may occur either on the cluster or on the remote bus. When a reset is generated on the cluster, WBox1 forwards it to WBox2, which in turn generates a reset on the remote bus. When a reset is generated on the remote bus, Wbox2 forwards it to Wbox1, which in turn generates a reset on the cluster.

According to a variant embodiment, when several resets occur at short intervals on the cluster (i.e. before WBox1 obtains a data slot grant from the central controller of the wireless network for transmitting the reset), only the last reset received before the data slot grant is transmitted to WBox2. The preceding resets are meaningless.

According to the present embodiment, a reset message from one wireless box to the other shall be acknowledged, once the reset has been carried out. This acknowledgment is made necessary by the fact that the wireless medium is not as reliable as the cable medium. According to the IEEE1394 standard, no acknowledgment of receipt is required for a bus reset on a wired bus.

The SSCS document mentioned above also describes a 'bus reset service' at section 6.4 of the IEEE 1394, with an acknowledgement of receipt. But this process concerns only the transmission of a reset originating on a wireless device to reset the wireless bus, not the transmission of a reset generated on one of the wired busses linked over the wireless network.

Moreover, user data traffic (asynchronous packets) is serialized with bus reset messages, meaning that all user data traffic (asynchronous packets) arriving—through the wireless connection—at a wireless box between the sending of the reset by this wireless box (WBox1, resp. WBox2) and the reception of the acknowledgment of receipt from the peer wireless box (WBox2, resp. WBox1) is simply discarded.

In other words, when a wireless box transmits a bus reset to its peer, all asynchronous data it receives is discarded, because it was sent by the peer wireless box before the reset was processed.

II] Data Link Layer

The behavior at the level of the IEEE 1394 data link layer is the following.

At the level of the wireless device connected to the cluster, the only modification of the standard IEEE1394 Link layer of WBox1 is that no unified transactions, as defined by the IEEE 1394 standard, are allowed. This is due to the fact that the transmission time over the wireless network is incompatible with the constraints imposed on unified transactions. According to IEEE 1394, a unified transaction consists in a request from one device and a response from a receiver device, in which the response is contained in the acknowledgment of the receiver device. Whether a transaction is unified or not (i.e. 'split') can be determined by the receiving node, depending on its capability to respond quickly to the request of the sending node. When a transaction is to be split, the responding node transmits an acknowledgment of receipt which informs the sending node that the transaction is 'pending', and that the response will be sent later on.

In the present case, all transactions which are addressed from the cluster to the remote bus or vice-versa are split.

When a node from the cluster sends a request to remote device 1 (i.e. using the node identifier of WBox1), this request is intercepted by WBox1, which responds with an acknowledgment of receipt to the sending device specifying that the transaction is pending. WBox1 then forwards the message to WBox2, which forwards it to the remote device. The remote device may respond by a unified or split transaction to WBox2, since the remote device is a standard IEEE 1394 device. Then the WBox2 device forwards the response to WBox1 which in turn forwards it to the node that has sent the request. If the remote device responds with a unified transaction (ack_complete), the Wbox2 generates a response packet to WBox1, which is not the case when the transaction is split, until the true response is sent instead of the 'pending' acknowledgment.

WBox1 expects packets bearing its node identifier as their destination node address.

When a packet is sent to WBox1, its node identifier shall be replaced by the remote device node identifier which is 0 before the packet is forwarded to WBox2.

At the level of the wireless device WBox2 connected to the remote bus, the same steps apply: when receiving a packet from the remote device 1, WBox2 responds with an acknowledgment of receipt informing the remote device that the transaction is pending, and forwards the packet to WBox1 over the wireless connection, which in turn forwards it on the cluster.

WBox2 maintains a routing table, containing the node identifiers ('1' to 'x') of nodes on the cluster. Packets destined to these nodes and circulating on the remote bus are forwarded over the wireless connection.

There is no need for a routing table in WBox1, since only one device is connected to the remote bus 8.

Asynchronous packets sent over an IEEE 1394 bus contain the node identifiers of the source node and of the destination node. The asynchronous packet format used on an IEEE 1394 bus at the level of the link layer is described at section 6.2.2. of the IEEE 1394 standard. Since according to the present invention, the wireless devices represent the nodes on the busses, the node identifiers in the asynchronous packets need to be modified by the wireless devices before being transmitted, so that the source and destination addresses are adapted to those valid on the target bus. In particular, the translation is carried out in order to avoid any confusion between the node_id '0' of the cluster and the node_id '0' of the remote bus (i.e. the node_id of the remote device). Thus the node_id of the wireless device WBox1 is replaced by that of the remote device for packets coming from the cluster, and the node_id '0' is replaced by that of WBox1 for packets coming from the remote bus. For other node_ids, there is no translation.

According to the present embodiment, this translation is carried out as follows:

TABLE 1

| | Packets originating from devices on cluster | Packets from remote device |
|---|---|---|
| Destination node identifier | WBox1 changes the destination node identifier corresponding to that of Wbox1 to that of the remote device on the remote bus (i.e. '0' according to the present embodiment) | Destination node identifiers of all packets sent by the remote device to Wbox2 are translated to the corresponding destination node identifier on the cluster |
| Source node identifier | If the source node identifier is 0, WBox1 changes it to the node identifier of Wbox1 | WBox2 changes the source node identifier (i.e. '0') to the node identifier of the peer wireless device (i.e. WBox1) |

The CRC values of the packets have to be recalculated accordingly.

III] Transaction Layer

At this layer, the behavior of the two wireless devices is similar.

Each wireless box runs two instances of transaction layers (i.e. the first one running on the IEEE 1394 stack, the second one running on the Hiperlan 2/1394 SSCS stack). For each transaction started by a wireless device on one stack, a parallel transaction is started on the other stack, having same parameters (transaction label, transaction code, retry code and priority). Indeed, a transaction can be identified by its source address, destination address and transaction label. The transaction label, as defined by the section 6.2.4.3 of the IEEE 1394 standard, identifies uniquely an outstanding transaction for a given node.

Figure 3:
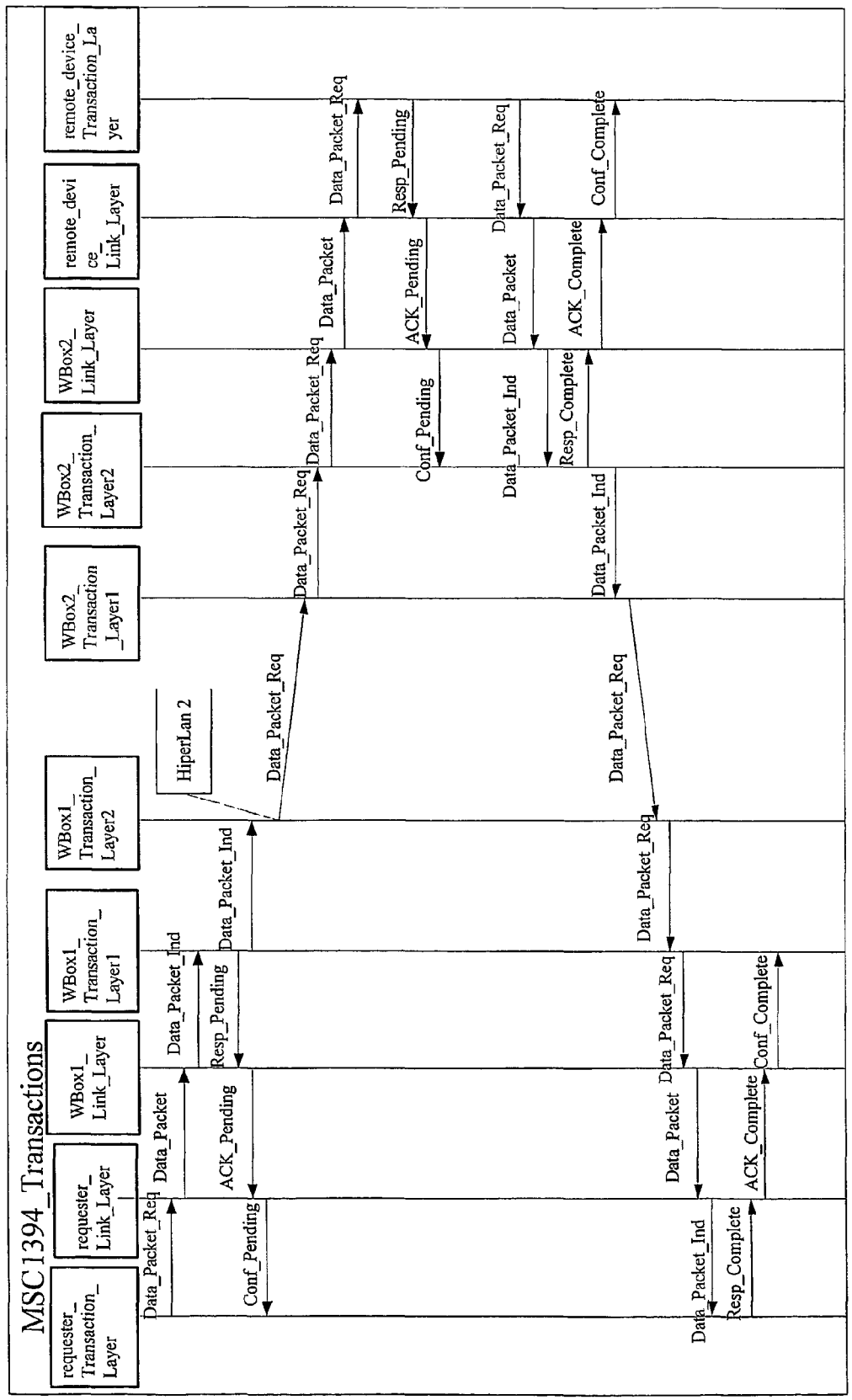
FIG. 3 is a diagram illustrating the exchanges between the different protocol layers of the devices involved in a request-response exchange.

FIG. 3 is a message sequence chart (MSC) illustrating the messages between the transaction and link layers of a requesting node of the cluster, the wireless box WBox1, the wireless box WBox2 and the remote device 1. As can be seen on this figure, the remote device acknowledges the request to the WBox2 device with a 'pending' message, indicating the split nature of the transaction on the remote bus. Note that the 'pending' acknowledgment of the remote device does not give rise to any message over the wireless connection back to the requester. Only the transmission of the response triggers a message to the requester.

The process of FIG. 3 will now be described in more detail. First, the request subaction processing will be described, followed by the response subaction processing. For information, a subaction consists in a complete sequence of arbitration, request transmission and acknowledgment.

(a) Subaction Request Processing

When a wireless device receives a subaction request from an IEEE 1394 device on a 1394 bus, it generates an acknowledgment packet comprising an 'ack_pending' code to indicate that the transaction will be a split transaction. If an error occurs during the transmission on the IEEE 1394 bus, then an appropriate error code (the same as defined below) is sent back by Wbox1 to the requester. If an ack_pending is sent to the requester, then the wireless device WBox1 forwards the request subaction to the peer wireless device WBox2. For this purpose, WBox1 starts a transaction towards its peer, using the same parameters, except for the translated source and destination addresses. According to the present embodiment, the WBox1 device uses the 'split timeout' process of IEEE 1394 to monitor the time it is going to wait for the response from WBox2

When a wireless device receives a request subaction from its peer over the wireless connection, it starts a transaction on the local bus to send the request subaction to its destination node. No address change is required at this level, since it has already been carried out by the peer wireless device.

If the transmission of the request subaction on the remote bus fails at the link layer level (i.e. the WBox2 device receives an acknowledgment of the type 'ack_data_error' or 'ack_busy'), the wireless device retries until the requester split timeout occurs. The requester split timeout is the split timeout of the initial node on the wired bus. This value is transferred during the transaction as defined below, using the 'time_of_life' parameter.

For information, a 'ack_data_error' is generated when the data field failed the CRC check, or the actual length of the payload did not match the length indicated in the header, and an 'ack busy' error is generated when a packet cannot be received because the transaction layer of the receiving node is busy, but might accept that packet on a retry.

If the transmission of the request subaction on the remote bus fails at the link layer level due to an 'ack_type_error', which is generated when a field in the request packet header was set to an incorrect or unsupported value, or an invalid transaction was attempted, the wireless device WBox2 shall generate a response subaction packet including the 'resp_type_error' code towards WBox1.

For more information on response and acknowledge codes, one may refer to the IEEE 1394 standard, sections 6.2.4.10 and 6.2.5.2.2 respectively.

(b) Subaction Response Processing

When a wireless device receives a response subaction from an IEEE 1394 device (either one of the cluster nodes, or the remote device) on an IEEE 1394 bus, it generates an acknowledgment packet comprising the 'ack_complete' code (signifying that the IEEE 1394 device has successfully accepted the packet). If an error occurred during transmission, then another appropriate code is used.

According to the embodiment, upon reception of the IEEE 1394 device response, the wireless device (whether WBox1 or WBox2) checks whether there is still a transaction pending for this response, by comparing the source and destination node identifiers and the transaction label with those it stored for sent requests. If the timeout has not yet occurred, the wireless device forwards the response subaction to its peer wireless device. Else, the response subaction is discarded, since the split timeout already occurred on the requester side.

When a wireless device receives a response subaction from a peer over the wireless connection, the receiving wireless device checks whether the transaction relating to this response subaction is still pending. If the timeout has not yet occurred for this transaction, the wireless device forwards the response subaction to the requesting device on its local bus, otherwise the packet is discarded. If the transmission between the wireless device and the requesting device fails at the link layer level, the wireless device retries until the split timeout occurs.

The differences between the transaction layers of the wireless devices WBox1 and WBox2 and the standard IEEE 1394 transaction layer will now be described.

The transaction layer running on the IEEE 1394 bus is the same as that specified by the IEEE 1394 standard.

The transaction layer of the wireless interface is the same as that specified by IEEE 1394, with the following amendments:

(1) Split Timeout:

According to the IEEE 1394 standard, each transaction-capable node on the network possesses a register called 'SPLIT_TIMEOUT' register, which defines the maximum time-out value before the sending/requesting node detects a split-transaction error. After this time, a requesting node terminates the transaction. By default, this time-out is 100ms.

For a requester the timeout period commences when an ack_pending is received in response to a request subaction. A responder starts the timeout period when an ack_pending is transmitted.

According to the BRAN 1394 SSCS document a 'time_of_life' parameter is defined, which the layer above the SSCS layer uses to communicate to the SSCS layer the time interval during which an asynchronous packet is allowed to survive on the wireless connection.

According to the present embodiment, when a wireless device starts a split timeout for a request coming from its peer wireless device, the timeout interval used by the transaction layer of the wireless device when communicating the request on its bus is not the interval contained in its 'SPLIT_TIMEOUT' register, but the time interval remaining when considering the time$_{of}$_life parameter derived from the request which was sent over the wireless connection and received from the SSCS stack/Hiperlan 2 transaction layers.

Figure 4:
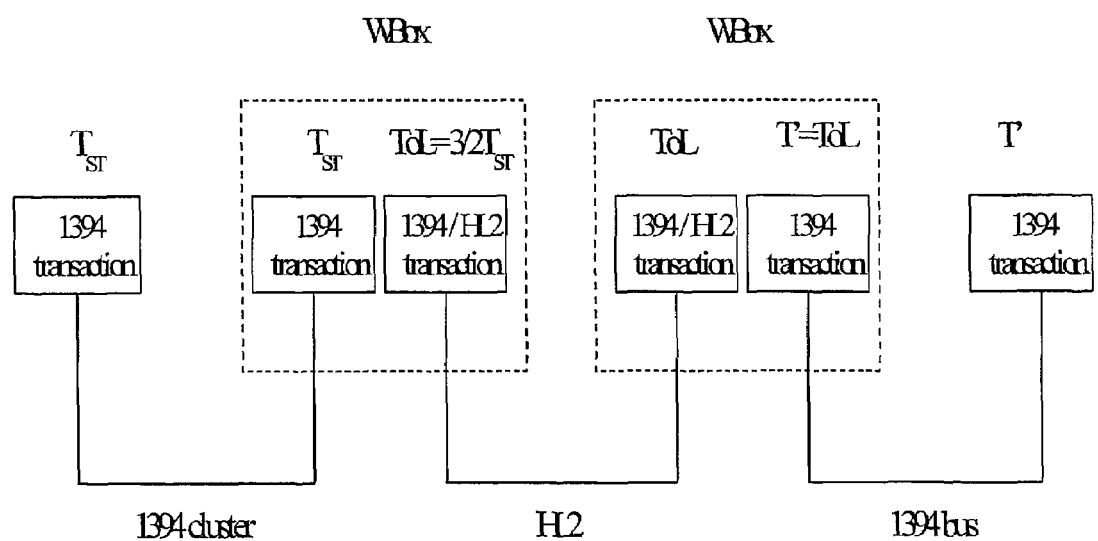
FIG. 4 is a diagram representing the relation between the split timeout and the time of life.

FIG. 4 represents the relation between the split timeout and the time of life values. On the 1394 bus of the requester, the time-out value comes from the SPLIT_TIMEOUT register and is fixed to $T_{ST}$. On the wireless link, the timeout value is the time_of_life as defined in the SSCS. On the 1394 bus of the responder the timeout value is the remaining time when considering the time_of_life parameter which is derived from the message sent over the wireless link.

(2) Source Node Identifiers in Transactions

The transaction layer of the wireless device has to process transactions with source address fields containing node identifier values other than the wireless device's own node identifier, e.g. when it forwards on its wired bus transactions from the wireless connection.

Lastly, the processing of bus reset signals according to the invention at this level will be described.

A transaction is defined between registers contained in the transaction layers of the wireless devices that are above the SSCS. This new register, called BUS_RESET register, contains the self_ID information of the cluster linked to the peer wireless box. It is used to initiate a bus reset and to transmit required information.

When a bus reset is detected by the Wbox1 on its cluster, Wbox1 sends a write request (reset message) on the BUS_RESET register of Wbox2, once the reset on the cluster is done. The write request contains the self_ID information of the cluster (the cluster also includes Wbox1). Wbox2 then performs a bus reset on its bus.

When the bus reset is performed on the remote bus, Wbox2 sends a write response (i.e. an acknowledgement of the reset message which contained the write request) to indicate that the bus reset is completed.

Note: this also applies for a bus reset detected on the remote bus.

When a wireless device receives a write request on its BUS_RESET register subsequent to a detection of an IEEE 1394 bus reset by the peer wireless device, its behavior is as follows:

it generates a bus reset on its wired bus, according to standard IEEE 1394 rules;

it discards all asynchronous packets received from the wired bus and that were not transmitted over the wireless connection before the reception of the bus reset indicator;

it sends to its peer wireless device asynchronous packets received from the wired bus after the wired bus reset.

When a wireless device detects a bus reset on its wired bus, it carries out the following steps:

it discards all asynchronous packets received from the peer wireless device and not transmitted on the wired bus before the detection of the bus reset;

it sends a write request on the BUS_RESET register of its peer wireless device and waits for the write response of the peer wireless device;

once the write response from the peer wireless device is received, transmission of asynchronous packets from the wireless connection to the wired bus is resumed.

According to the IEEE1394 standard, when a bus reset occurs, all pending asynchronous transactions and subactions are discarded. This is not a problem when the transaction is a request transaction, but when the transaction is a response transaction, then subsequent to the discarding, the responder may ignore that its message has been discarded. However, this may already happen on the serial bus due to the split timeout operation running on two different systems: a device on one system may respond after the timeout on the requesting device has already expired. In this case, an error recovery procedure is triggered to solve the problem.

IV] Control and Status Registers (CSRs)

According to the IEEE 1394 standard, each device on the 1394 bus possesses registers which other devices may access. The register architecture ('CSR' for Control and Status Registers) is defined by the document IEEE 1212-1994 and IEEE 1394-1995.

According to the present invention, the control and status registers (CSRs) of the device WBox1 and WBox2 are not visible to the IEEE 1394 devices. Any read, write or lock request from one of the IEEE 1394 devices on the cluster to a specific CSR of the remote device is immediately forwarded to the corresponding remote device CSR by the Wbox1. Likewise, if the remote device sends a request to a device on the cluster, the WBox2 intercepts and forwards this request.

V] Wireless Device Role Election

It has been assumed in what precedes that each wireless device knows whether it is connected to the cluster or whether it is connected to the remote device. Since the wireless devices are in principle identical, a process for determining their respective role is required.

According to the present embodiment, each device in a pair of wireless devices contains an identifier known by the other device of the pair. Upon power on, a wireless device carries out the following steps:

Detection of Another Wireless Device:

If the wireless device acts as a Wireless Terminal (in the sense of BRAN Hiperlan 2), it shall try to associate to a Central Controller (also in the sense of BRAN Hiperlan 2) by scanning frequencies. If the wireless device acts as a Central Controller, it has just to find a free frequency, send a beacon at regular intervals and wait for a Wireless Terminal to try to associate.

Reading the unique identifier in the read-only memory of the detected device (the 'EUI_64' identifier).

Verifying whether this identifier is that of its peer or not. If not, the Wireless Terminal disassociates and tries to find another Central Controller on another frequency.

According to a variant embodiment, the read-only memory of each device contains a directory which describes the device's characteristics. The location of this area is known by other devices, which may access it to determine whether the detected wireless device may be selected as a peer wireless device or not. In this case, pairing of devices as in the main embodiment above is not necessary.

Once two wireless devices have recognized each other, they exchange the self identification packets described earlier and relating to their respective IEEE 1394 wired busses.

Three cases are to be considered:

(1) A first wireless device is connected to more than one IEEE 1394 device, while the second wireless device is connected to only one IEEE 1394 device. In this case, the first wireless device acts as the device connected to the cluster and the second wireless device acts as the device connected to the remote device.

(2) Each wireless device is connected to a plurality of IEEE 1394 devices. The interaction fails.

(3) Both wireless devices are connected to only one IEEE 1394 device. An arbitration takes place in order to decide which of the two busses will be considered as the cluster. According to the present embodiment, the wireless device having the smallest EUI-64 identifier is considered to be the device connected to the cluster.

VI] Isochronous Transmission

The present embodiment concerns the processing of an MPEG2 Stream, using IEC 61883 in the 1394 busses.

Assuming IEC 61883 is used for isochronous data transmission, any operation in the Plug Control Registers (PCRs) that is detected and forwarded by the wireless boxes shall be processed to allocate resources on the wireless links: from a PCR lock_request, the wireless box can know which 1394 channel is going to flow in which direction (oPCR versus iPCR). It can thus prepare its Data Link layer to flow the corresponding channel.

Note: there is no control on the wireless resource allocation themselves: if the wireless link becomes overloaded, then the isochronous stream will not be correctly transmitted over the wireless medium without any specific feedback in the 1394 stacks.

(a) A Stream Coming from the Cluster

Two options are possible:

IEC 61883 is terminated in every wireless device and an MPEG2 TS may be regenerated in each wireless device.

A wireless device does not terminate IEC 61183, but just provides the buffers to ensure a constant delay for the transmission of CIP packets between both wireless devices. In addition, it restamps source packet header time stamps according to the overall delay.

(b) A Stream Coming from the Remote Device

Same as before.

VII] Clock Synchronization

In order to achieve correct operation of IEC 61883 time stamps, the two buses need to be synchronized: one bus has to be locked on the other.

The cycle master is running on any node of the cluster. WBox1 generates the cycle clock towards WBox2 (using the clock synchronization service of HL2 1394 SSCS TS). Wbox2 uses the IEEE 1394 force root bit in the self_id packets to ensure it becomes the root. It thus generates cycle start packets based on its locked clock (and not based on a free running 24.576 MHz clock).

VIII] Isochronous Resource Manager (IRM)/Bus manager (a) Cycle Master

The global cycle master will be one of the cluster devices (except Wbox1). Nevertheless on the isolated device bus, WBox2 acts as a local cycle master (the WBox2 cycle clock being locked on the global cycle master cycle clock).

(b) Isochronous Resource Manager (IRM)

At least one device (except Wbox1) connected to the cluster shall be IRM capable. Consequently, since the elected IRM is the one which has the highest node_id, the remote device will never be the IRM (node_id always equal to 0 according to the present embodiment).

(c) Bus Manager

WBox2 shall prevent the remote device to write to the BUS_MANAGER_ID register of any other devices—, so that the remote device never becomes the bus manager. Wbox2 shall reject the lock request issued by the remote device (response_code=resp_address_error) until a bus manager is pointed out within the cluster. However, according to the IEEE1394 specification, since the bus manager challenger must request a lock until it obtains a request Status COMPLETE and a Response code of resp_complete, a Bus manager shall be chosen somewhere in the cluster.

If one (or more) cluster device is Bus manager capable then one cluster device will be elected as the bus manager. Thus, the node_id of that bus manager device will be returned on the next lock request to the BUS_MANAGER_ID issued by the remote device.

If no device within the cluster is bus manager capable, then Wbox 1 will play the role of the Bus manager. The node_id 1 (may be any between 1 and the number of devices connected to the cluster) will be returned on the next lock request to the BUS_MANAGER_ID issued by the remote device. Consequently, all operations attempted by the remote device relative to the bus manager will be intercepted by the Wbox 1 ('Read the Speed Map register' for instance). Of course, all operations attempted by any cluster device relative to the bus manager will not be forwarded to the remote device but will be processed by the Wbox1.

IX] Miscellaneous Broadcast In/Broadcast Out

If some devices generate some broadcast out streams on the cluster, the isolated device may also establish a broadcast in connection to a similar channel on one of its iPCR. Wireless devices have to handle this.

According to the present embodiment, Wbox1 regularly polls iPCRs of the isolated device to see whether there is a broadcast in connection. If it finds one, then it shall access the oPCRs of the cluster devices to check whether there is one connected broadcast out oPCR for the same channel. If it finds one, then it shall configure its link layer as well as the wbox1 link layer so that the corresponding 1394 channel is transmitted over the wireless link.

X] Comments

Although the embodiment concerns the linking of a single remote device to a cluster of devices, the invention is not limited to this embodiment, and many aspects which have been described also apply when two clusters (each with several devices) are to be linked. In particular the following aspects are concerned:

- in case a plurality of resets are detected by a wireless box on its cluster, only one reset message is sent;
- a reset message sent from one wireless box to its peer is acknowledged once the reset has been carried out;
- the process of discarding asynchronous packets in case of a reset, as described;
- having the wireless boxes decide that all transactions they receive from their clusters are split transactions;
- avoiding transmission of 'ack_pending' codes over the wireless link;
- the determination of the timeout interval by a wireless box when forwarding on its cluster a request receiver from the other cluster;
- the fact for a wireless box to make forwarding of a response from its cluster over the wireless link dependent on the timeout.

The invention claimed is:

1. Method for connecting an IEEE1394 compliant device to a cluster of IEEE1394 compliant devices connected to a first wired bus through a wireless link comprising a first wireless device connected to the first wired bus and a second wireless device connected to the IEEE 1394 compliant device, comprising:

assigning identifiers to the devices connected to the first wired bus, including the first wireless device;

transmitting, on the first wired bus, a message addressed to the IEEE 1394 compliant device by a device connected to the first wired bus, the message comprising an identifier using the identifier of the first wireless device; and forwarding the message by the first wireless device to the second wireless device, wherein the IEEE 1394 compliant device appears to be directly connected to the first wired bus to the devices on the first wired bus wherein for one of the first and second wireless devices:

detecting a reset on a wired bus to which one of the first and second wireless devices is connected, and forwarding said reset to other one of the first and second wireless device.

2. Method according to claim 1, where the step of forwarding the reset comprises the step of:

carrying out a write request to a register of the peer wireless device, wherein the writing to the register triggers a reset procedure on the wired bus associated with the other wireless device.

3. Method according to claim 2, wherein when the wireless device having detected the reset on the wired bus to which the wireless device is connected is the first wireless device, before forwarding the reset, the first wireless device participates in a self-identification process and forwards its resultant physical address and self identification data describing the devices of the first bus to the second wireless device.

4. Method according to claim 3, further comprising the step, for the second wireless device, upon reception of the reset and the self identification data, of:

requesting root status, generating self identification packets corresponding to devices of the first bus towards the IEEE 1394 compliant device, wherein the number of generated packets corresponds to the number of devices on the first bus, excluding said first wireless device.

5. Method according to claim 4, further comprising the step, for the second wireless device of:

attributing a predetermined node identifier to the IEEE 1394 compliant device.

6. Method according to claim 5, wherein said first wireless device modifies source and destination addresses of asynchronous packets received from its associated bus as follows:

if the source address is equal to the predetermined node identifier, replacing the source address by the node Identifier of the first wireless device;

if the destination address is equal to the node identifier of the first wireless device, replacing the destination address by the predetermined node identifier.

7. Method according to claim 5, wherein said second wireless device modifies source and destination addresses of asynchronous packets received from the IEEE compliant 1394 device as follows:

replacing the source address by the node identifier of the first wireless device;

if the destination address is equal to the node identifier of the first wireless device, replacing the destination address with the predetermined node identifier.

8. Method according to claim 1, further comprising the step, for one of the wireless devices of, upon detection of a plurality of resets on the bus to which it is connected, forwarding only the latest reset detected before the grant of a data slot on the wireless link for forwarding a reset.

9. Method according to claim 1, further comprising the step, for one of the wireless devices receiving a reset from the other wireless device, of acknowledging receipt of the reset once the reset has been carried out on the bus to which it is connected.

10. Method according to claim 1, further comprising the steps, for a transaction layer of one of the wireless devices detecting a reset received from the other wireless device, of:

generating a bus reset on the bus to which the one of the wireless devices is connected, discarding asynchronous packets received from bus to which the one of the wireless devices is connected and not transmitted to the other device before reception of the reset, upon completion of the bus reset, acknowledging the reset to the other wireless device.

11. Method according to claim 1, further comprising the steps, for a transaction layer of one of the wireless devices detecting a bus reset received on the bus to which the one of the wireless devices is connected, of:

discarding asynchronous packets received from the other wireless device and not transmitted on bus to which the one of the wireless devices is connected before detection of the bus reset, forwarding a reset message to the other wireless device and waiting for an acknowledgment of reset from the other wireless device, resuming transmission of asynchronous packets to said other wireless device after receipt of the acknowledgement.

12. Method for connecting an IEEE1394 compliant device to a cluster of IEEE1394 compliant devices connected to a first wired bus through a wireless link comprising a first wireless device connected to the first wired bus and a second wireless device connected to the IEEE 1394 compliant device, comprising:

assigning identifiers to the devices connected to the first wired bus, including the first wireless device;

transmitting, on the first wired bus, a message addressed to the IEEE 1394 compliant device by a device connected to the first wired bus, the message comprising an identifier using the identifier of the first wireless device;

forwarding the message by the first wireless device to the second wireless device, wherein the IEEE 1394 compliant device appears to be directly connected to the first wired bus to the devices on the first wired bus, and sending a request from a first device of the first bus to the IEEE 1394 compliant device, the second wireless device setting a timeout interval for receiving a response from the IEEE 1394 compliant device, wherein the timeout interval is equal to the remaining time when considering a time-of-life parameter sent by the first wireless device with the request.

13. Method according to claim 12, wherein the second wireless device forwards a response from the IEEE 1394 compliant device to the first wireless device only if the timeout interval for this response from the IEEE 1394 compliant device has not expired.

14. Method for connecting an IEEE1394 compliant device to a cluster of IEEE1394 compliant devices connected to a first wired bus through a wireless link comprising a first wireless device connected to the first wired bus and a second wireless device connected to the IEEE 1394 compliant device, comprising:

assigning identifiers to the devices connected to the first wired bus, including the first wireless device;

transmitting, on the first wired bus, a message addressed to the IEEE 1394 compliant device by a device connected to the first wired bus, the message comprising an identifier using the identifier of the first wireless device; and forwarding the message by the first wireless device to the second wireless device, wherein the IEEE 1394 compliant device appears to be directly connected to the first wired bus to the devices on the first wired bus, and having the second wireless device prevent the IEEE compliant 1394 device from becoming bus manager.

15. Method according to claim 14, wherein the step of preventing the IEEE compliant 1394 device from becoming bus manager comprises the step of preventing the IEEE compliant 1394 device to write to a BUS_MANAGER_ID register.

* * * * *